(12) United States Patent
Home et al.

(10) Patent No.: US 6,484,145 B1
(45) Date of Patent: Nov. 19, 2002

(54) PRIORITY ACCESS CHANNEL RESERVATION

(75) Inventors: Sandra Lee Home, Plano, TX (US); Cheng-Nan Chern, Wheeling, IL (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/346,403

(22) Filed: Jul. 1, 1999

(51) Int. Cl.$^7$ .............................................. G06F 17/60
(52) U.S. Cl. ................. 705/8; 379/112.03; 379/112.04; 455/450
(58) Field of Search ...................... 379/112.03, 112.04; 455/450; 705/1, 7, 8

(56) References Cited

U.S. PATENT DOCUMENTS

| | | | |
|---|---|---|---|
| 4,456,788 A | * 6/1984 | Kline et al. | ................. 379/137 |
| 5,491,837 A | 2/1996 | Haartsen | |
| 5,574,974 A | 11/1996 | Almgren et al. | |
| 5,828,948 A | 10/1998 | Almgren et al. | |
| 6,075,848 A | * 6/2000 | Lunn et al. | ............. 379/112.01 |
| 6,246,880 B1 | * 6/2001 | Iizuka | ......................... 455/446 |
| 6,324,403 B1 | * 11/2001 | Jalloul | ......................... 455/446 |
| 2001/0054097 A1 | * 12/2001 | Chafe | ......................... 709/224 |

FOREIGN PATENT DOCUMENTS

JP 2000-307735 * 11/2000

OTHER PUBLICATIONS

Tatsuno: "New Consortium To Develop Mobile Computer Data Network"; New Technology Week, Jun. 1, 1992, vol. 6, No. 22.*

Tunnicliffe et al: "Analysis of traffic distribution in cellular networks"; VTC '98 48$^{th}$ IEEE Vehicular Technology Conference Pathway to a Global Wireless Revolution; (Cat. No. 98CH36151) 1998, Part vol. 3, p. 1984–1988, (Abstract Only).*

Smith et al: "Analysis of traffic distribution in cellular networks"; 1999 IEEE 49th Vehicular Technology Conference; (Cat. No. 99CH36363) 1999, Part vol. 3, p. 2075–2079, (Abstract Only).*

* cited by examiner

*Primary Examiner*—Edward R. Cosimano
(74) *Attorney, Agent, or Firm*—John D. Crane; Bracewell & Patterson, L.L.P.

(57) ABSTRACT

A method and system for priority access channel allocation within a telecommunication subsystem in which channel access requests are categorized within a prioritization system that includes a first priority level, and a second priority level which is lower than in priority with respect to the first priority level. A targeted blocking rate is first assigned to the first priority level. During active operation of the telecommunication subsystem, a statistical estimation of an actual traffic intensity for the first priority level is performed. Thereafter, the targeted blocking rate and estimated traffic intensity are utilized in computing a blocking threshold for the first priority level. This blocking threshold defines a number of channels, n, to which access by the second priority level will be blocked, such that the first priority level may achieve its assigned targeted blocking rate.

24 Claims, 6 Drawing Sheets

PRIORITY ACCESS CHANNEL RESERVATION

BACKGROUND OF THE INVENTION

1. Technical Field

The present invention relates in general to an improved telecommunications system, and in particular to a method and system for prioritizing traffic channel allocation in a channel reservation system. More particularly, the present invention relates to reserving traffic channels by computing and periodically adjusting blocking thresholds. Still more particularly, the present invention relates to a method and system in which pre-assigned blocking rates are utilized in conjunction with statistically estimated traffic fluctuations to guide blocking threshold adjustments.

2. Description of the Related Art

Corresponding to the explosive growth in cellular subscriber density, radio frequency (RF) related techniques providing more efficient allocation of limited traffic channels available within a limited RF spectrum are urgently required. Priority Access Channel Assignment (PACA) is a recently conceived methodology that provides multiple level priority access to voice channels based on the designated priority level of the user. PACA is particularly useful during periods when few or no idle or unused traffic channels are available.

Channel reservation within a wireless communications subsystem is becoming increasingly necessary to alleviate problems that arise due to all mobile subscribers having equal opportunity to access available channels. An example of such a problem is that which occurs when high value subscribers require channels during periods of high blocking (during periods of free or low cost airtime, for example). A more urgent example such problems occur during emergencies, when emergency services (911 type calls, for example) are invoked.

A PACA queuing technique for providing priority access to voice channels has recently been defined in TIA-664 and in some air interface standards. PACA queuing provides a method to queue call origination requests based on priority, when there are no traffic channels (sometimes referred to as "voice channels") available. This method often includes delivering a reply message to the user indicating that the request is queued and its queue position.

There are several problems with current implementations of PACA. First, PACA addresses and implements prioritization only after all voice channels have been assigned, thus causing a delay in service to a potentially high priority user. Another problem with PACA is that is does not provide the ability to queue termination access requests nor does it address handling of intersystem handoff of calls queued. In addition, implementation of PACA often results in increased control channel messaging (especially on the forward control channel), potentially impacting other telecommunications services.

The demand for a workable solution to the shortcomings of conventional traffic channel priority allocation may increase for many reasons including: government regulations and recommendations for providing enhanced emergency services, especially during crisis situations; promotional and competitive offers by Service Providers to offer low or free air time; increased number of mobile subscribers; and, competition among Service Providers that offer some form of priority service.

It can therefore be appreciated that a need exists to address the problem of all mobile subscribers having equal access to traffic channels regardless of congestion or priority. Providing different levels of access to voice channels based on a priority pre-assigned to the subscriber would permit subscribers/users to receive the benefit of a multilevel prioritization in a wireless communications network.

SUMMARY OF THE INVENTION

It is therefore one object of the present invention to provide a method and system for prioritizing traffic channel allocation in a channel reservation system.

It is another object of the present invention to provide a method and system for reserving traffic channels by computing and dynamically adjusting blocking thresholds.

It is yet another object of the present invention to provide a method and system in which pre-assigned blocking rates are utilized in conjunction with statistically estimated traffic fluctuations to guide blocking threshold adjustments.

The above and other objects are achieved as is now described. A method and system are disclosed for providing priority access channel allocation within a telecommunication subsystem in which channel access requests are categorized within a prioritization system that includes a first priority level, and a second priority level which is lower in priority with respect to the first priority level. A targeted blocking rate is first assigned to the first priority level. During active operation of the telecommunication subsystem, a statistical estimation of actual traffic intensity experienced by the first priority level is performed. Thereafter, the targeted blocking rate and estimated traffic intensity are utilized in computing a blocking threshold for the first priority level. This blocking threshold defines a number of channels, n, to which access by the second priority level will be blocked, such that the first priority level may achieve its assigned targeted blocking rate.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The method and system of the present invention may be utilized to provide consistent multi-level priority access to voice/traffic channels for mobile subscribers based on a dynamic channel reservation technique. The objectives of this technique include allowing a targeted blocking rate to be associated with each level of priority, and striving to achieve these targets by dynamic adjustments in channel reserves in response to real-time traffic fluctuations.

Figure 1:
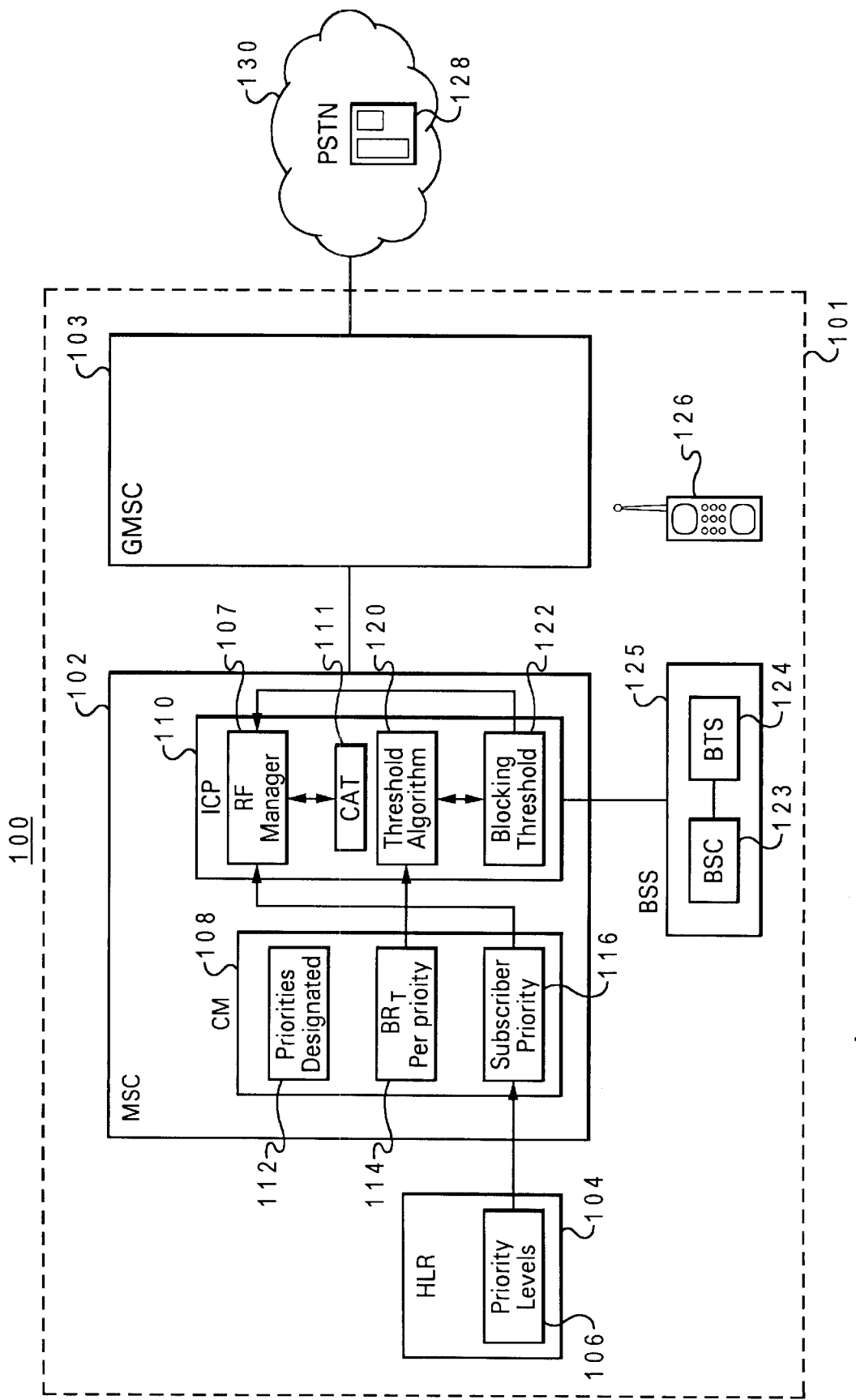
FIG. 1 illustrates a telecommunication system in which the method and system of the present invention may be implemented.

With reference now to the figures and in particular with reference to FIG. 1, there is depicted a block diagram illustrative of an example physical configuration of a telecommunications system 100 in accordance with the present invention. As illustrated in FIG. 1, telecommunications system 100 includes the network interconnection of a cellular subsystem 101 to a Public Switched Telephone Network (PSTN) 130 within which a Public Safety Answering Point (PSAP) 128 resides. Cellular subsystem 101 is a Time Division Multiple Access (TDMA) wireless communications system in the depicted example. Although the depicted example is a TDMA system, those skilled in the art will appreciate and understand the extensions necessary to implement the present invention in other types of wireless communications system, such as, for example, Code Division Multiple Access (CDMA), Global System for Mobile communications (GSM) or Japanese Digital Cellular Standards. Also within cellular subsystem 101 is a Mobile Subscriber Unit 126. Although MSU 126 is depicted in FIG. 1 as a handheld cellular phone, the present invention may also be practiced utilizing other portable or stationary wireless communication devices.

PSAP 128 is included within FIG. 1 to illustrate a particularly urgent example of the circumstances under which the present invention may be advantageously utilized. A PSAP is an agency or facility authorized to receive and respond to emergency calls requiring public services such as fire, police, and ambulance services. Due to the aforementioned growth in utilization of wireless communications technology, it is more important than ever to ensure reliability of access of mobile users to emergency services such as a PSAP. As explained in further detail in relation to the following figures, the method and system of the present invention may be utilized to provide enhanced assurance that priority access may be reliably provided to a particular category of mobile communications devices (preassigned within the profile information) or a particular landline destination service.

The term "priority level", as utilized herein, may refer to a category of priority mobile user subscriptions, or a category of services such as wireless call termination or handoff, that require a traffic channel be allocated upon request. In the former case, priority designation can be included within wireless user profile information. In the latter case, priority designation would not be associated with any particular MSU such that priority access would be provided for any MSU which attempts a "priority access", such as an emergency call. Priority designation may therefore be allocated with a MSC such as MSC 102 or GMSC 103 based on translation of the code entered ("9-1-1", for example) in its attempt to originate an emergency call. The MSC would define the translation of a pre-designated emergency code as requiring a priority level designation. As utilized herein, the term "channel" refers to a resource allocated to support a single wireless access. Depending on the type of telecommunications system being used, a channel may be comprised of an RF range, a time slot of an RF range, or a mathematical code utilized within a wideband RF spectrum.

As illustrated in FIG. 1, cellular subsystem 101 includes a Home Location Register (HLR) 104, a Mobile Switching Center (MSC) 102, a Gateway Mobile Switching Center (GMSC) 103, a Base Station System (BSS) 125, and MSU 126. HLR 104 is essentially a customer database within cellular subsystem 101 in which subscriber profile information for MSUs, such as MSU 126, is permanently stored. In accordance with the present invention, such subscriber profile information includes a priority access identification code by which users of telecommunications subsystem 100 are identified as entitled to a given level of priority access to traffic channels available within telecommunications subsystem 100. Among such users may be mobile subscribers or, as explained above with reference to PSAP 128, a particular call access service, such as origination attempts to landline emergency services, or such as handoff requests. An access identification code may identify two or more distinct priority access levels, referred to hereinafter as "priority levels", into which subscribers will be divided. In accordance with the present invention, higher priority users will be identified by means of a coding scheme within HLR 104 as having a higher level of access to existing and available traffic channels.

As utilized herein, "priority access" refers to a system for allocating a limited number of traffic channels either among wireless users such as MSU 126, wireless network services such as handoff, or for wireless access to landline services such as PSAP 128 according to the relative priority level at which MSU 126, handoff requests, and PSAP 128 have been assigned. Proposed methods of meeting the growing need for prioritization include a queuing technique known as Priority Access Channel Assignment, or PACA. A PACA queuing technique for providing priority access to voice channels is defined in TIA-664 and in some air interface standards.

MSC 102 and GMSC 103 are responsible for the switching of trunk circuits as well as the processing of call setup and mobility management signaling messages. In addition to these standard switching functions, GMSC 103 functions as a telecommunications gateway, and is coupled to PSTN 130. BSS 125 includes a base transceiver station (BTS) 124 and a base station controller (BSC) 123.

GMSC 108 performs switching of a call to or from PSTN 130 and MSUs, such as MSU 126, within cellular subsystem 101. MSCs 102 and 103 perform the necessary switching functions for any compatible MSU located within a geographic area associated with a particular MSC, called an MSC area. An MSC monitors the mobility of its subscribers and manages necessary resources needed to handle and update location registration procedures and carry out handoff functions. Although, in the depicted example, only two MSCs are illustrated in cellular subsystem 101, other numbers of MSCs may be employed depending on the communications system. Each MSU utilizes a separate, radio frequency (RF) channel to communicate with a BSS. The RF channels utilized for control functions such as call setup during an origination attempt will be referred to hereinafter as control channels. In contrast, RF channels utilized by MSUs to conduct communications are sometimes referred to as voice channels and will be referred to hereinafter interchangeably as "traffic channels". RF channels utilize a pair of frequencies for communication—one for transmitting from a BTS, the forward link, and one frequency for the BTS to receive transmissions from MSUs, the reverse link.

In accordance with the teachings of the present invention, both GMSC 103 and MSC 102 may contain a channel database, depicted within MSC 102 as channel allocation table 111. Channel allocation table 111 may be included within an intelligent cellular peripheral 110 along with an associated RF manager 107, a blocking threshold algorithm 120, and blocking thresholds 122. The significance of channel allocation tables that may reside within the MSCs are discussed in further detail in association with FIG. 3. MSC 102 also includes a computing module 108 in which priority level information such as priority designations 112, targeted blocking rates 114, and priority level information 116 from subscriber priority levels 106 within HLR 104.

HLR 104 is a functional unit within typical cellular systems such as cellular subsystem 101, and is utilized for management of mobile subscribers. Subscriber information and the part of the MSU information that permits incoming calls to be routed to the MSC for a particular MSU are stored within HLR 104. For example, MSU identity, ESN number, and subscriber profile data are stored within HLR 104. In accordance with the method and system of the present invention, user profile information within HLR 104 may include priority level designations 106. Priority level designations 106 may be maintained and updated within HLR 104 and accessed when needed by MSC 102 to update subscriber priority information 116.

BSS 125 comprises the physical equipment for providing radio coverage to defined geographical areas called cells.

BSS 125 contains the hardware necessary to communicate with MSUs 126. BSC 123 performs control functions, while BTS 124 performs the transmitting/receiving function within a given cell utilizing radio transmission/receiving equipment.

Figure 2A:
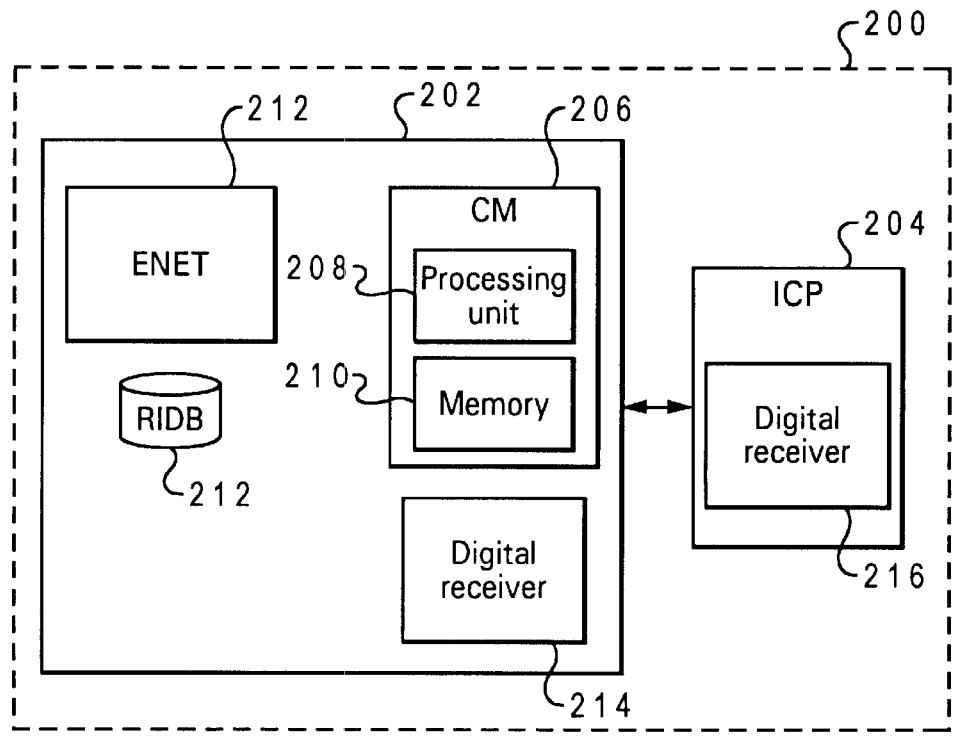
FIG. 2A is a block diagram of a switch in which a preferred embodiment of the present invention may be implemented.
Figure 2B:
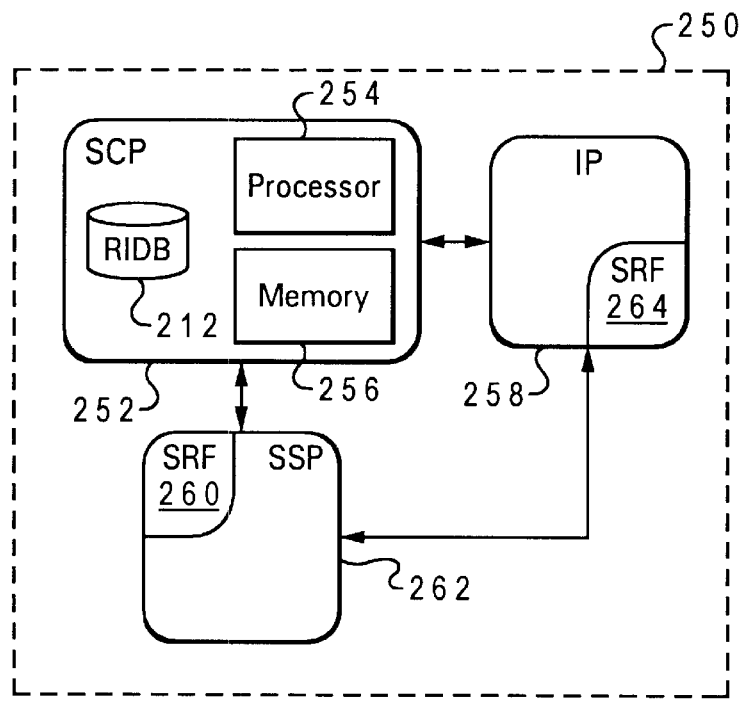
FIG. 2B is a block diagram of physical components in an intelligent network in which a preferred embodiment of the present invention may be implemented.

With reference now to FIGS. 2A–2B, block diagrams illustrating different physical configurations for switch components in which a preferred embodiment of the present invention may be implemented are depicted. FIG. 2A is a block diagram of a physical switch 200 representative of the DMS family of switch products available from Nortel Networks Corporation. Switch 200 may be employed within communications system 100 depicted in FIG. 1 as one of MSCs 102 or 103 and provides the functionality described with reference to FIG. 1.

Switch 200 as depicted in FIG. 2A includes a central unit 202 connected to intelligent cellular peripheral (ICP) 204. Central unit 202 contains a computing module (CM) 206, which employs processing unit 208 and memory 210 to provide switch intelligence functions for switch 200. The availability of processing unit 208 within central unit 202 makes it possible to implement priority allocation of traffic channels from within central unit 202. ICP 204 also includes a processing unit that may be more uniquely qualified to implement the method and system of the present invention since, as described with reference to ICP 110 of FIG. 1, it may be directly associated with channel allocation functions. Processing unit 208 may comprise, for example, one or more processors executing instructions to provide logic for call processing and to implement processes described below for a preferred embodiment of the present invention. Memory 210 stores instructions and data and may include random access memory (RAM) and/or read only memory (ROM) for storing channel allocation data in accordance with the method and system of the present invention as described below.

Central unit 202 also includes enhanced network (ENET) 212, which provides a switch fabric function. Central unit 202 also includes an integral routing information database (RIDB) 212. Digital receiver 216 along with another digital receiver 214, that is located within central unit 202, may provide voice recognition functions in place of or in addition to recognizing DTMF tones.

FIG. 2B depicts a block diagram of physical components in an intelligent network 250 representative of a International Telecommunications Union switch, defined by ITU-T Q.1200. Intelligent network 250 includes a service control platform (SCP) 252, which is the service intelligence for intelligent network 250. Within service control platform 252 is a processor unit 254 and a memory 256, which contain the processing logic for providing per call real-time channel allocation and assignment in the depicted example. Additionally, service control platform 252 also contains a routing information database (RIDB) 212. Network 250 also contains a service switch platform (SSP) 262, which provides switch fabric functions. Specialized resource functions (SRFs) 260 is found within service switch platform 262. Specialized resource function (SRF) 260 provides DTMF functions for recognizing signals from MSUs. Intelligent peripheral (IP) is 258 also a part of network 250 and provides voice server functions. Additionally, within intelligent peripheral 258 is specialized resource function 264, which also serves to provide DTMF functions.

Figure 4:
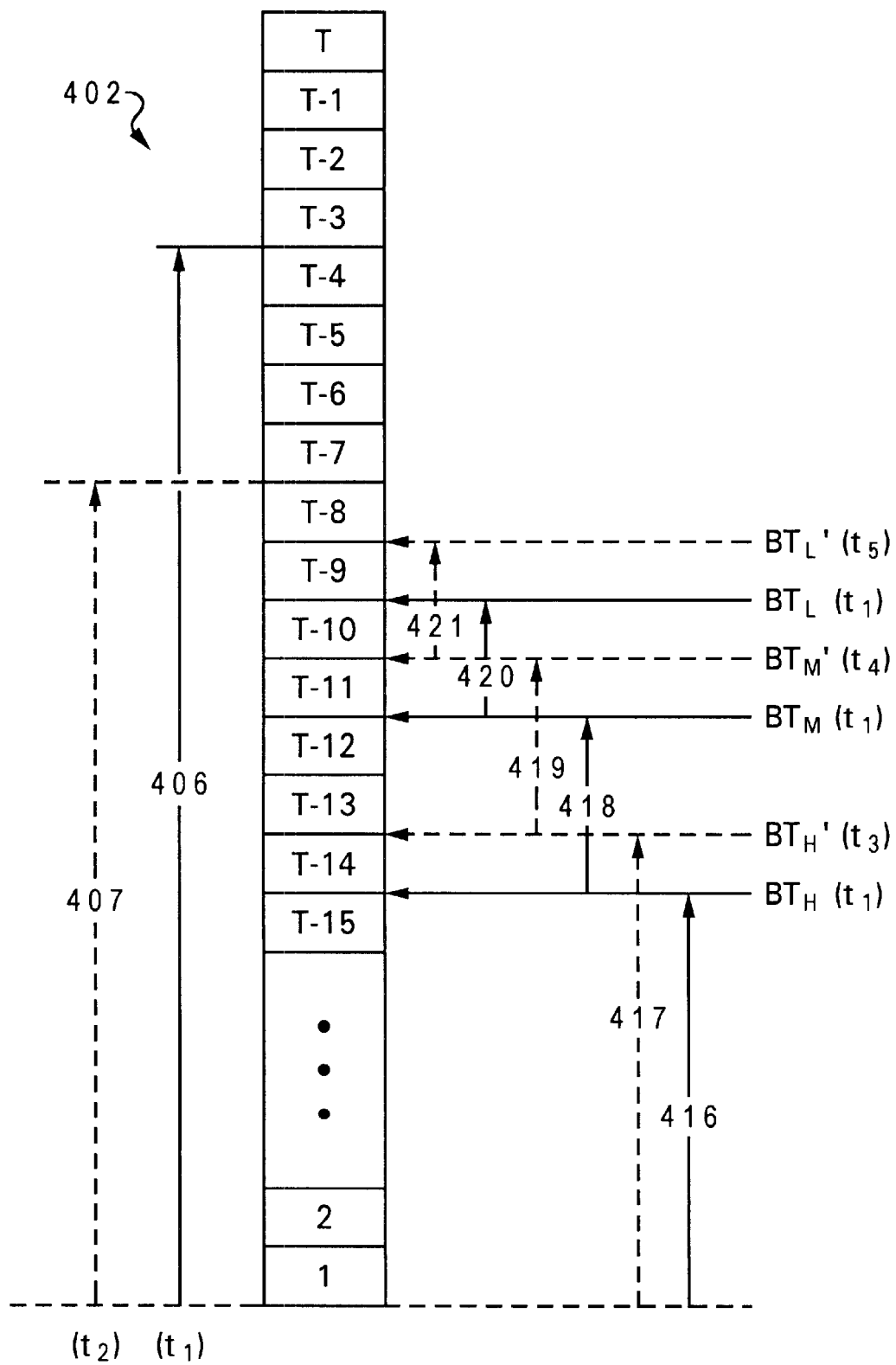
FIG. 4 is a block diagram depicting multiple blocking thresholds that may be utilized to guide traffic channel resource allocation in accordance with the teachings of the present invention.

In a preferred embodiment of the present invention, a switch such as switch 200 or intelligent network 250 maintains a traffic channel list within a radio frequency (RF) resource manager as described in further detail in FIG. 4. Therefore, when a call setup request is received from a MSU, the switch will determine first how many traffic channels are currently available. Next, the switch will determine whether, according to the priority level of the call access request, the request for a channel will be granted or denied. It should be noted that priority level designations may not be assigned to all subscribers. For clarity, subscribers with no priority designation will be referred to hereinafter as being a "non-priority" user or subscriber. In contrast, subscribers that have been designated by the service provider as warranting a higher grade of service will be referred to hereinafter as "priority subscribers".

Although the examples in FIGS. 1, and 2A–2B depict switches as the environments in which the processes of the present invention may be implemented, the processes of may also be implemented in other data processing systems. For example, the processes of the present invention may be implemented within a computer having a connection to a switch, with the computer providing the logic and commands to the switch to execute the processes. Alternatively, the processes may be implemented to operate in an intelligent device operating in conjunction with a switch.

Turning back to FIG. 1, there is depicted within MSC 102, a set of devices and entities that may be utilized to implement the method and system of the present invention. MSC 102 includes a RF channel manager 107, a computing module 108, and an Intelligent Cellular Peripheral 110. RF channel manager 107 is responsible for several channel allocation functions in accordance with the teachings of the present invention. As illustrated within MSC 102, RF channel manager 107 is in communicative contact with channel allocation table 111. Although channel allocation table 111 is depicted in FIG. 1 as a distinct entity, channel allocation table 111 may be contained within RF channel manager 107. RF channel manager 107 is responsible for maintaining and updating a list of traffic channels within channel allocation table 111.

Figure 3:
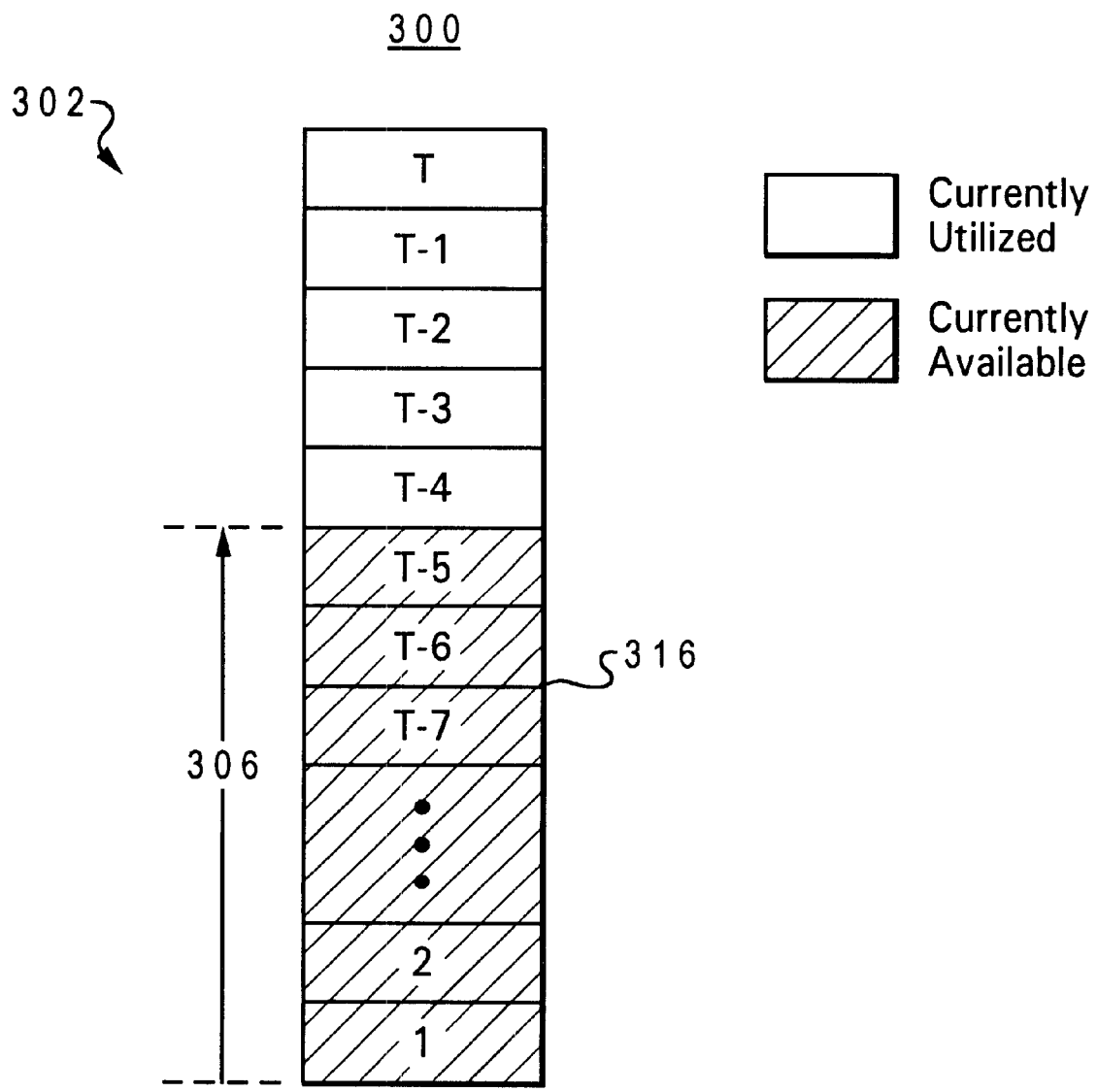
FIG. 3 is a block diagram depicting a blocking threshold which may be utilized to guide traffic channel resource allocation in accordance with the teachings of the present invention.

FIG. 3 is a block diagram depicting a traffic channel prioritization system 300 in which blocking thresholds may be utilized to guide traffic channel resource allocation in accordance with the teachings of the present invention. As illustrated in FIG. 3, prioritization system 300 includes a set, or pool of "T" traffic channels 302, where "T" denotes the total number of traffic channels within channel pool 302.

For purposes of illustrating the concept of "blocking thresholds", the channels within channel pool 302 are individually designated within channel pool 302 in descending numeric sequence (T, T-1, T-2, etc.). The first block within traffic channel set 302 therefore designates the "Tth" traffic channel with no relevance associated with a particular individual channel.

At any given instant in time during runtime operations of a telecommunications system in which prioritization system 300 is a subsystem, a portion of channels within channel pool 302 are currently being utilized and are therefore unavailable for other call requests. As illustrated in FIG. 3, the number of such utilized channels is equal to five. The number of unutilized, or available channels 306 is therefore T-5. Due to variations in traffic demand for channel allocation, the number of available channels will often fluctuate. A "blocking threshold" for a given priority level, refers to the point within traffic channel set 302 below which access to the remaining available channels is blocked for priority or non-priority levels below the level for which the threshold is designed to protect. A blocking threshold 316 has been assigned to a priority level within prioritization system 300.

The utility of the present invention lies in dynamically prioritizing channel allocation during fluctuating traffic conditions in which the number of available channels decreases to below designated threshold levels. Blocking threshold 316 has no effect on channel allocation decisions while the number of available channels 306 is greater than or equal to T-6. When the number of available traffic channels drops below blocking threshold 316 (i.e. when there are fewer than T-6 channels currently available within channel pool 302) non-priority channel allocation requests will be blocked while priority channel allocation requests will continue to be granted as long as at least one channel remains available.

Turning now to FIG. 4, a channel prioritization system 400 is depicted which utilizes multiple priority levels in accordance with the teachings of the present invention. Within channel prioritization system 400, is a channel pool 402 analogous to channel pool 302 described with reference to FIG. 3. In accordance with the method and system of the present invention, a high-priority blocking threshold 416 is assigned to a highest priority level "Y", a medium-priority blocking threshold 418 is assigned to the next lower level "Y-1", and a low-priority blocking threshold 420 is assigned to still a lower level "Y-2". Each of these thresholds indicates the point within channel set 402 at which access by relatively lower priority levels to traffic channels will be denied as the number of available channels falls below each threshold. As illustrated in FIG. 4, the number of available channels 406 at time $t_1$ is equal to T-4.

At time $t_1$, the three blocking thresholds depicted in FIG. 4 include: a high-priority blocking threshold $BT_H$ 416, for high priority level "Y"; a medium-priority blocking threshold $BT_M$ 418, for medium priority level "Y-1"; and a low-priority blocking threshold 420 for low priority level "Y-2". High-priority blocking threshold 416 ensures priority access for priority level "Y", by blocking access of lower priority levels "Y-1", "Y-2", as well as non-priority users to channels that remain available after the number of available channels has fallen below blocking threshold 416. $BT_H$ 416 therefore defines the number of channels within channel pool 402 reserved for the exclusive use of level "Y". When high traffic intensity causes the number of currently available channels to drop below threshold 416, all access requests except those having a priority designation of "Y" (i.e. levels "Y-1", "Y-2" and non-priority access requests) will be blocked.

When the number of available channels falls below $BT_L$, non-priority channel allocation requests will be denied access to the remaining available channels. In such a case, all three priority levels, Y, Y-1, and Y-2, will continue to have access until the number of available channels falls below $BT_M$. If the available number of channels drops below $BT_M$, then non-priority channel allocation requests and those with a priority designation of "Y-2" will be denied access to the remaining available channels. Similarly, if the number of available traffic channels within channel pool 402 drops below $BT_H$, only priority level "Y" will have access to the remaining channels. As illustrated in FIG. 4, the blocking thresholds $BT_H$, $BT_M$, and $BT_L$ may be dynamically adjusted in accordance with shifting traffic demands. The manner in which such adjustments are effectuated is described in further detail in reference to FIG. 5.

From the perspective of the priority level whose threshold is being considered, the blocking threshold is the minimum number of channels that must be available to the priority level such that the likelihood of a blocked call request by a subscriber within that priority level will be no greater than a targeted blocking rate. As utilized herein, the term "blocking rate" refers to a likelihood that given call origination or termination request (including handoff requests) will terminate unsuccessfully due to unavailability of traffic channels.

The probability of a call origination, termination, or handoff request (all three will be referred to hereinafter as a "call request") being blocked due to unavailability of traffic channels may be advantageously expressed as a percent probability between 0 and 1. Erlang's B-formula is utilized within the method and system of the present invention in one of two possible formulations. In the first formulation, the Erlang B-formula is utilized to statistically estimate traffic intensity data. In the other formulation, Erlang B-formula is utilized to predict the required number of channels accessible to a priority level, such that the target blocking rate for that level may be attained.

Referring back to FIG. 1, it will be noted that the channels comprising channel pools 302 or 402 may be associated with particular geographic regions that are significant with respect to telecommunications network 100. Therefore channel pools 302 or 402 may comprise all traffic channels available within the geographic area associated with a base transceiver station such as a cell or other region in which subscribers mutually share a common group of traffic channels.

Figure 5:
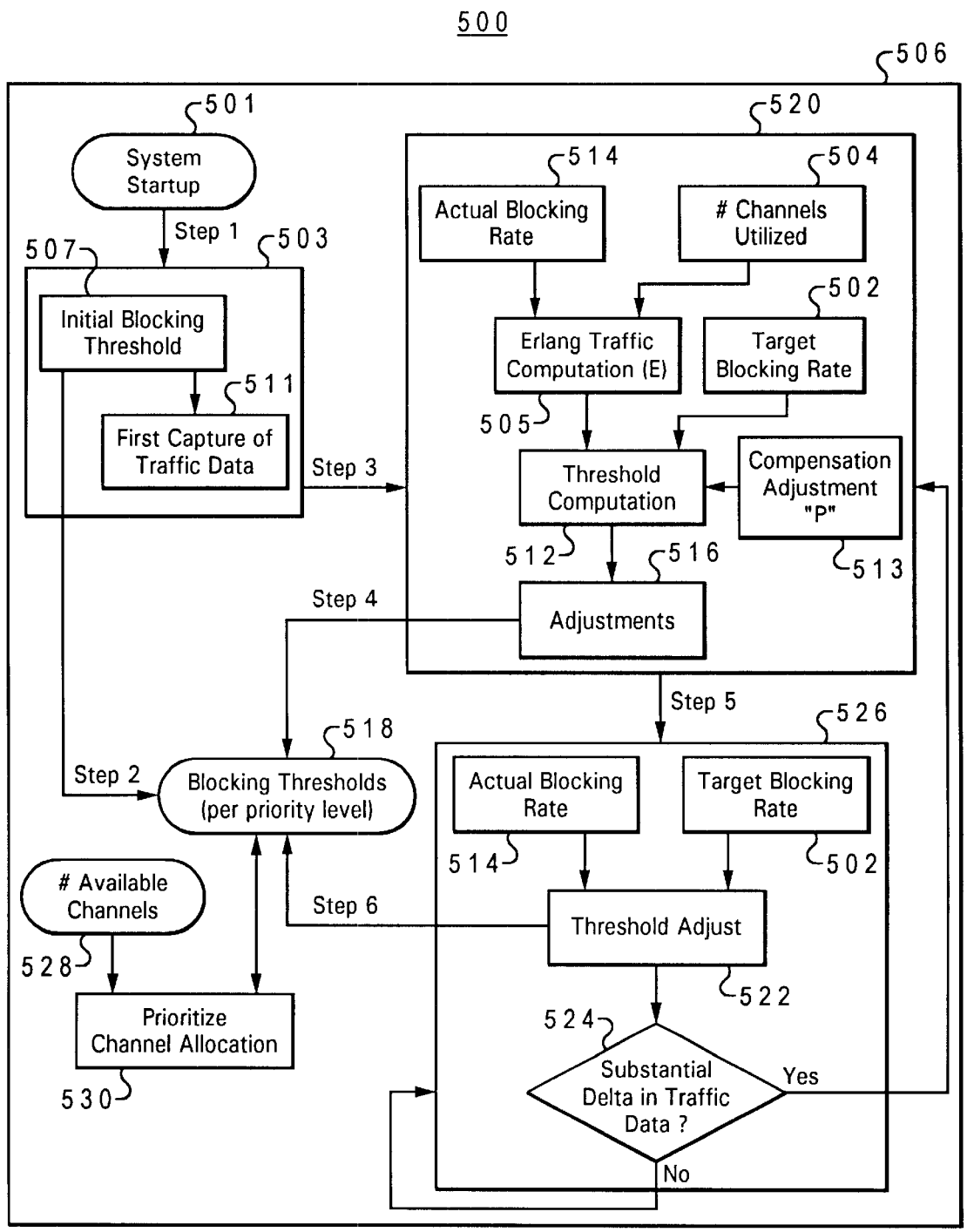
FIG. 5 is a block diagram depicting a channel prioritization system in accordance with the method and system of the present invention.

The network devices depicted in FIGS. 1, 2A, and 2B, may be utilized to implement blocking thresholds as illustrated in FIGS. 3 and 4 as depicted in FIG. 5. FIG. 5 is a high level flow diagram is illustrating a channel prioritization system 500 that may be utilized to generate and dynamically adjust blocking thresholds in accordance with the teachings of the present invention. As depicted in FIG. 5, channel prioritization system 500 begins as illustrated at block 501 which depicts the initialization of a telecommunications system in which dynamic channel reservation in accordance with the method and system of the present invention may be practiced. The system proceeds at step 1 to priority access initialization as depicted within block 503. During such initialization, initial blocking thresholds are assigned to priority levels as shown at block 507. Next, at step 2, the initial blocking thresholds are assigned to priority levels at blocking thresholds block 518.

After initial thresholds have been set, an initial set of raw traffic data is captured as depicted at block 511, such that the initially assigned blocking thresholds may be dynamically adjusted in accordance with current traffic data. The process continues from block 503 to blocking threshold algorithm 520 at step 3. Blocking threshold algorithm 520 is central to channel prioritization system 500, and may be implemented within an intelligent network device 506. Referring back to FIGS. 2A and 2B, intelligent network device 506 may be a subsystem such as ICP 204 of switch 200 or SSP 262 of intelligent network 250.

Within blocking threshold algorithm block 520 is an Erlang traffic intensity computation block 505. Block 505 illustrates computation of an Erlang traffic intensity which provides blocking threshold computation block 512 with data regarding fluctuations in traffic intensity. In one embodiment of the present invention, current traffic intensity is determined in units of Erlangs by utilizing the Erlang-B formula. An estimation of traffic intensity, E, for a particular priority level may be thus obtained in accordance with the relation:

$$\frac{\frac{E^N}{N!}}{\sum_{i=o}^{N} \frac{E^i}{i!}} = B$$

Where N designates the current number of channels utilized by a priority level, and B designates the actual blocking rate for that priority level. Operational measurements (OMs) are network parameters collected within an intelligent network device 506 which may be utilized to provide a direct or indirect indication of the number of channels currently utilized within a priority level. In the embodiment depicted in FIG. 5, and as illustrated at block 504, the number of channels, N, currently utilized is obtained in accordance with the following relation:

$N$=(# calls for priority level/total # calls) *(avg. channels currently utilized)

The actual blocking rate 514 may also be obtained either directly or from calculations with OMs gathered in the ordinary course of operations within intelligent network device 506 in accordance with the following relation:

$B$=(# calls blocked for a priority level/unit time)/(total calls/unit time)

Block 502 illustrates targeted blocking rates which serve as inputs for blocking threshold computation, depicted at block 512. The same targeted blocking rates (and same block 502) are depicted within block 526 as inputs into blocking threshold adjustments calculations illustrated at block 522. Targeted blocking rates 502 specify a desired blocking rate for a particular category or level of subscribers. For example, for a Public Safety Answering Point (PSAP) that handles emergency calls, the targeted blocking rate for origination and termination access may be set to 1%. There may be several additional gradations in priority levels and associated targeted blocking rates. Going back to the example above, the next lower priority level may include handoff requests and high value termination requests with an associated targeted blocking rate of 2%, followed by high value subscriber originations at 3% and government agencies at 4%. The details provided in this example are for illustrative purposes only and do not limit the scope of the present invention.

Within blocking threshold computation block 512, Erlang-B may again be advantageously utilized. Computation block 512 depicts computation of a blocking threshold in accordance with the relation:

$$\frac{\frac{E^n}{n!}}{\sum_{i=o}^{n} \frac{E^i}{i!}} = B_T$$

in which $B_T$ is the targeted blocking rate depicted at block 502, E is the estimated traffic intensity, and n is the number of channels that must be available to a given priority level in order to achieve the targeted blocking rate $B_T$ associated with that level. The blocking threshold for the current priority level is then determined by adding to n, the number of traffic channels, p 513, to which the current priority level will be blocked from accessing due to prior restraints. Referring back to FIG. 4, at time $t_1$ the blocking threshold $BT_M$ associated with priority level Y-1 has a value of n=3 which has been added to T-15 (blocking threshold of Y which prevents access by Y-1) to obtain $BT_M$=T-12. Thus, for all priority levels below the highest level, an additional compensation input parameter 513 is required for the threshold computation at block 512.

As another example of why such adjustments may be necessary, and referring back to FIG. 4, it can be seen that an increase in telecommunications traffic intensity at time $t_2$ has resulted in an increase in the number of currently utilized channels from four at time $t_1$ to eight at time $t_2$. The number of available traffic channels at time $t_2$ 407 has decreased correspondingly from T-4 to T-8. A subsequent blocking threshold computation for $BT_H$ may result in high-priority level blocking threshold $BT_H$ 416 having to be "raised" to $BT_H'$ 417 at time $t_3$ at which T-14 channels rather than the previous T-15 are reserved for the exclusive use of high priority users. As seen in FIG. 4, in order to maintain consistent blocking levels for medium and low priority levels, blocking thresholds $BT_M$ 418 and $BT_L$ 420 will then require adjustment. To account for this and similar "ripple effects", blocking thresholds for a series of related priority levels such as "Y", "Y-1", and "Y-2" described in reference to FIG. 4 may be determined in a sequential manner in order of descending priority (i.e. "Y-1" threshold computed after "Y" and before "Y-2"). Each blocking threshold may thus be automatically adjusted in accordance with any shifts in the next highest level as part of threshold computations illustrated at block 512. As depicted in FIG. 4, these adjustments include shifting $BT_M$ 418 to $BT_M'$ 419 at time $t_4$, and shifting $BT_L$ 420 to $BT_L'$ 421 at time $t_5$.

Block 516 depicts a possible readjustment of blocking thresholds computed at block 512. For example, a problem may arise when it is impossible to meet the reservation requirements as set forth at block 512 due to the limited number of channels engineered. In such a case, the original computed blocking threshold may have to be adjusted accordingly as depicted at block 516.

After a blocking threshold of a given priority level is computed or adjusted, it is delivered to blocking threshold block 518 as illustrated at step 4. Blocking thresholds within block 518 may be advantageously utilized in conjunction with other parameters, such as the number of currently available channels depicted at block 528, for channel resource allocation as illustrated at block 530 and as described in greater detail with reference to FIG. 6. Referring back to FIG. 1, channel resource allocation may be employed within a MSC which assigns traffic channels in response to call origination, termination and handoff requests. In the case of a call origination request, channel resource allocation may either grant or deny the request based on the availability of channels that fall within the blocking thresholds as described in FIGS. 3 and 4.

After a first set of blocking thresholds have been computed, the system proceeds at step 5 to the dynamic threshold adjustment phase of prioritization system 500. As seen in FIG. 5, a threshold adjustment cycle begins at adjustment block 526 and may proceed in one of two alternative paths. In order to ensure reliable access for priority users, the blocking thresholds may require frequent adjustments. Traffic data must therefore be monitored on a nearly continuous basis, so that blocking thresholds may be adjusted to account for near real-time traffic fluctuations. Due to the somewhat computation intensive nature of blocking threshold algorithm 520, the feature of the present invention illustrated at block 526 provides an efficient means of adjusting blocking thresholds in response to minor traffic fluctuations.

As illustrated within adjustment block 526, actual blocking rates are calculated and monitored as described with reference to block 514. These blocking rates may then be directly compared to targeted blocking rates, illustrated at block 502, to first decide whether to increment or decrement a blocking threshold as illustrated at block 522. If the current blocking rate is higher than the target blocking rate for a particular priority level, then, as shown at step 6, the blocking threshold for that priority level may be incremented by a predetermined, fixed amount. Similarly, if the current blocking rate is lower than the target, the blocking threshold may be decremented by a fixed amount. Next, as illustrated at query block 524, the magnitude of the difference between a current blocking rate and a targeted blocking rate is analyzed. If this differential is not sufficiently substantial (in accordance with a pre-determined baseline differential), the process resumes within adjustment block 526 without the need to compute traffic intensity.

In an important feature of the present invention, when a sufficiently substantial delta in traffic intensity is detected at query block 524, the system returns to the blocking threshold algorithm at block 520. A new blocking threshold may then be computed as illustrated by blocks 504, 514, 505, 512, and 516. Implementation of this newly calculated blocking threshold may be necessary to maintain the original targeted blocking rates within block 502 for each designated priority level.

Figure 6:
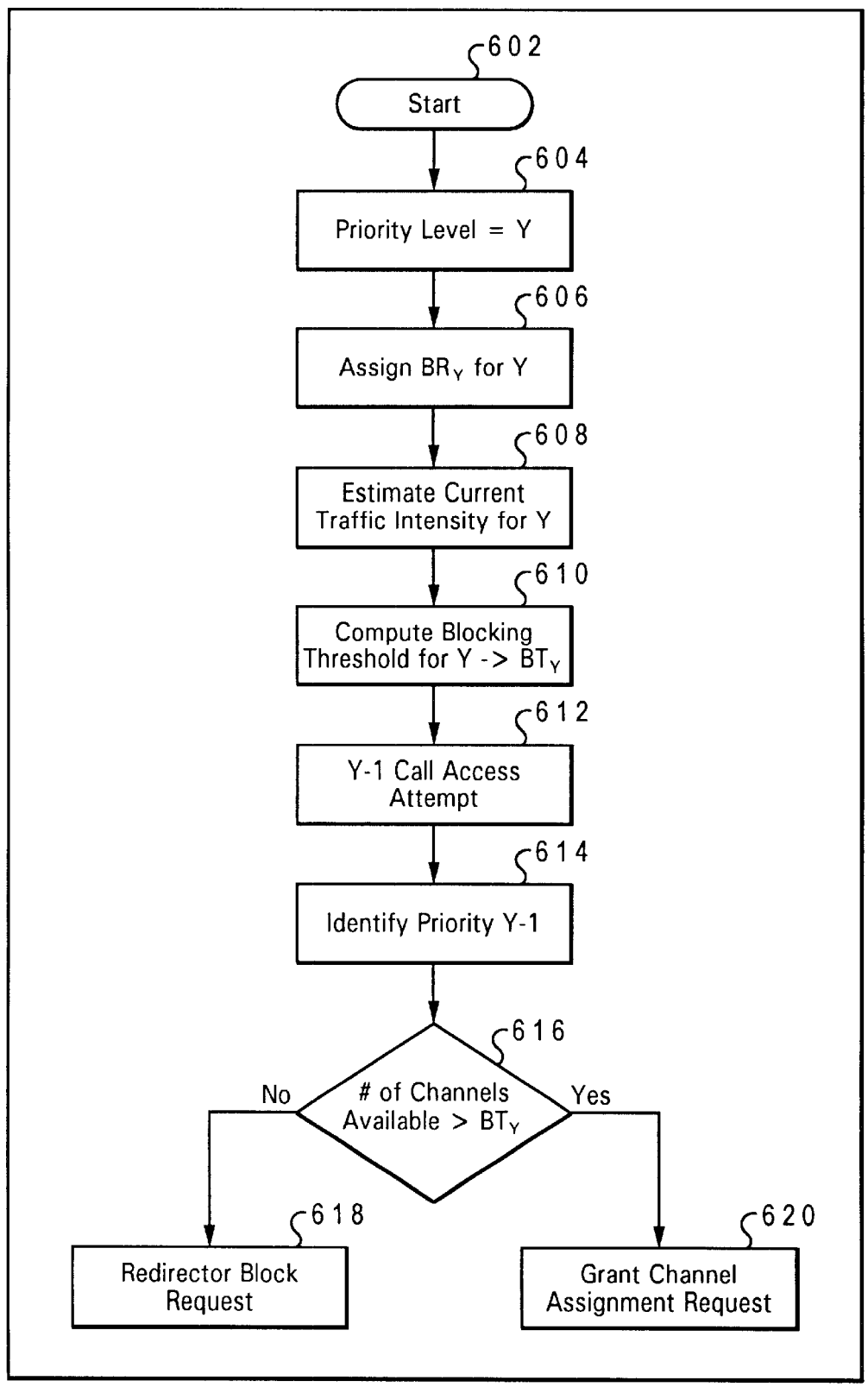
FIG. 6 is a high level flow diagram depicting a series of steps that may be utilized in one embodiment of the present invention to provide priority access channel allocation in response to a channel access request.

Turning now to FIG. 6, there is depicted a high level logic diagram of a priority access channel allocation method in accordance with the teachings of the present invention. The method begins at step 602 and proceeds to step 604 which depicts the definition of a priority level "Y". Priority level "Y" may by comprised of a set of priority subscribers that have been designated by the telecommunication service provider as warranting a given level of call access reliability. Priority level "Y" may alternatively designate a particular call access category such as handoff requests that may require increased assurance of availability. A subscriber (telecommunications customer) may be designated as belonging within a priority level by use of an alphanumeric code maintained within a subscriber's profile in a customer database. A call access category, such as "handoff requests", may be similarly designated within a network switch. In either case, the switch may obtain the priority designator when a call access attempt is made to or from a mobile subscriber. Closely related to the priority designation at step 604, a targeted blocking rate $BR_Y$ is assigned to priority level "Y" as illustrated at step 606. $BR_Y$ designates the targeted blocking rate as a decimal number between 0 and 1.

The method resumes at step 608 which depicts computation of an estimate of the current traffic intensity. In accordance with the teachings of the present invention, and as described with reference to FIG. 5, the input parameters that may be utilized to obtain an estimate of the current traffic intensity include the current blocking rate and the number of channels utilized. Erlang-B formula may then be employed to determine a statistical estimate of the current traffic intensity. Erlang-B formula (sometimes referred to as "Erlang's loss formula") is well known in the field of queueing theory. Erlang-B is often called a "loss" system because it envisions a system in which customers are not allowed to wait (i.e. no queueing). A representative formulation of Erlang-B that may be executed at step 608 is a lows:

$$\frac{\frac{E^N}{N!}}{\sum_{i=o}^{N} \frac{E^i}{i!}} = B$$

Where B designates the actual blocking rate for a priority level "Y", N is the number of channels currently utilized by priority level "Y", and E designates the traffic intensity in Erlangs.

After the traffic intensity has been estimated, a blocking threshold for priority level Y, $BT_Y$, is computed as depicted at step 610. First, $BR_Y$ and the traffic intensity for priority level Y are input into Erlang-B formula to obtain the number of channels, n, required to be available to Y in order to achieve $BR_Y$. Next, $BT_Y$ is determined by adding to n, the number of channels having prior restraints (higher priority blocking thresholds or handoff reserves, for example) which make them inaccessible to Y. As explained with reference to FIGS. 3 and 4, $BT_Y$ determines the point at which access will be denied to priority levels lower than Y.

The blocking threshold, $BT_Y$, may be associated with priority level "Y" within a network switch such that the switch may allocate traffic channels in accordance with this information as illustrated at steps 612 through 620.

Next, a channel allocation request associated with the next lower priority level, "Y-1", is placed to a switch at step 612. The switch then utilizes the "Y-1" priority level identifier as the pertinent priority access designator in deciding whether the channel access attempt will be granted at step 614. $BT_Y$ is one of the blocking thresholds that is applicable to the channel allocation request made by priority level Y-1. Since Y-1 is lower in priority to priority Y, the call access attempt by Y-1 is subject to being blocked by Y's blocking threshold, $BT_Y$, which defers to Y or any higher priority levels. The two possible consequences of the determination depicted at step 616 are shown as steps 618 and 620. If, as illustrated in steps 616 and 620, a determination is made by the switch that the number of currently unutilized, or available traffic channels is greater than $BT_Y$, then the switch will grant the channel allocation request by assigning a traffic channel for the request. On the other hand, if, the current number of unutilized traffic channels is less than or equal $BT_Y$, the channel allocation request will either be blocked or redirected as depicted at steps 616 and 618.

Preferred implementations of the invention include implementations as a computer system programmed to execute the method or methods described herein, and as a program product. According to the computer system implementation, sets of instructions for executing the method and system of the present invention are resident in a storage device such as the random access memory (RAM) of one or more computer systems. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the steps described in association with FIGS. 1, 2A, 2B, 3, 4, 5, and 6 can be accomplished with a computer-aided device. In such a method, data stored in a memory unit of a data-processing system such as a data-processing system, can represent steps in a method for implementing a preferred embodiment of the present invention.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A channel allocation method within a telecommunication subsystem in which channel access requests are categorized within a prioritization system that includes a first priority level, and a second priority level which is lower in priority to said first priority level, said channel allocation method comprising the steps of:

assigning a targeted blocking rate to said first priority level;

statistically estimating a traffic intensity for said first priority level; and computing a blocking threshold for said first priority level in response to said assigned targeted blocking rate and said estimated traffic intensity, wherein said blocking threshold defines a number of channels, M, to which access by said second priority level will be blocked, such that said first priority level achieves said targeted blocking rate.

2. The channel allocation method of claim 1, wherein said step of computing a blocking threshold for said first priority level includes the step of computing a number of channels, n, required to be available to said first priority level, such that said first priority level may achieve said targeted blocking rate.

3. The channel allocation method of claim 2, wherein said step of computing n for said first priority level includes the step of statistically predicting n in accordance with the relation:

$$\frac{\frac{E^n}{n!}}{\sum_{i=o}^{n} \frac{E^i}{i!}} = B_T$$

Wherein $B_T$ designates said targeted blocking rate, and E designates said actual traffic intensity in Erlangs.

4. The channel allocation method of claim 3, wherein said step of computing a blocking threshold for said first priority level includes the step of computing M in accordance with the relation:

$$M=n+p$$

Wherein p is the number of channels to which said first priority level does not have access.

5. The channel allocation method of claim 4, wherein said step of statistically estimating a traffic intensity for said first priority level is repeated over a first cycle which precedes a second cycle, said channel allocation method further comprising the steps of:

comparing a current traffic intensity estimation performed during said second cycle with a past traffic intensity estimation performed during said first cycle;

in response to said current traffic intensity estimation deviating from said past traffic intensity estimation by an amount greater than or equal to a predetermined differential:

recomputing n for said first priority level in accordance with the relation:

$$\frac{\frac{E^n}{n!}}{\sum_{i=o}^{n} \frac{E^i}{i!}} = B_T$$

Wherein $B_T$ designates said targeted blocking rate of said first priority level, and E designates said actual traffic intensity experienced by said first priority level in Erlangs;

recomputing M in accordance with the relation:

$$M=n+p$$

Wherein p is the number of channels to which said first priority level does not have access; and in response to said current traffic intensity estimation deviating from said past traffic intensity estimation by an amount less than said predetermined differential:

incrementing or decrementing said blocking threshold such that M is adjusted upward or downward as necessary such that said actual blocking rate experienced by said first priority level approaches said assigned targeted blocking rate.

6. The channel allocation method of claim 5, wherein said first cycle precedes said second cycle in a periodic manner.

7. The channel allocation method of claim 1, wherein said step of statistically estimating a traffic intensity for said first priority level comprises the steps of:

determining an actual blocking rate, B, for said first priority level; and obtaining a statistical estimation of an actual traffic intensity, E, for said first priority level in accordance with the relation:

$$\frac{\frac{E^N}{N!}}{\sum_{i=o}^{N} \frac{E^i}{i!}} = B$$

Wherein B designates said actual blocking rate for said first priority level, and N is the number of channels currently utilized by said first priority level.

8. The channel allocation method of claim 7, wherein said step of determining an actual blocking rate for said first priority level includes the step of computing said actual blocking rate in accordance with the relation:

$$B = X/C$$

Wherein X designates the number of calls blocked for said first priority level over a pre-designated timestep, and C designates the total number of call requests made within said telecommunications subsystem during said timestep.

9. The channel allocation method of claim 7, wherein said step of statistically estimating a traffic intensity for said first priority level further comprises the step of computing the number of channels, N, currently utilized within said first priority level in accordance with the relation:

$$N = [(Y/C) \times Z]$$

Wherein Y designates the number of call requests by said first priority level, C designates the total number of call requests made within said telecommunications subsystem during a pre-designated timestep, and Z designates the average number of channels utilized within said telecommunications subsystem during said timestep.

10. The channel allocation method of claim 7, wherein said telecommunication subsystem includes an intelligent network device, and wherein said step of determining an actual blocking rate for said first priority level comprises the steps of:

collecting operational measurements within said intelligent network device; and determining said actual blocking rate for said first priority level from said operational measurements.

11. The channel allocation method of claim 10, wherein said intelligent network device includes a processing unit which is in communicative contact with a customer database, and wherein said step of assigning a targeted blocking rate to said first priority level is preceded by the steps of:

designating said first priority level utilizing a numeric code;

storing said numeric code designation of said first priority level within said customer database; and delivering said numeric code designation of said priority level from said customer database to said processing unit.

12. The channel allocation method of claim 11, wherein said steps of assigning a targeted blocking rate, statistically estimating a traffic intensity, and computing a blocking threshold are performed utilizing said processing unit.

13. The channel allocation method of claim 11, wherein said step of defining said first priority level comprises the step of categorizing each of a plurality of user subscriptions as belonging within said first priority level.

14. A channel allocation system within a telecommunication subsystem in which channel access requests are categorized within a prioritization system that includes a first priority level, and a second priority level which is lower in priority to said first priority level, said channel allocation system comprising:

means for assigning a targeted blocking rate to said first priority level;

means for statistically estimating a traffic intensity for said first priority level; and means for computing a blocking threshold for said first priority level in response to said assigned targeted blocking rate and said estimated traffic intensity, wherein said blocking threshold defines a number of channels, M, to which access by said second priority level will be blocked, such that said first priority level achieves said targeted blocking rate.

15. The channel allocation system of claim 14, wherein said means for computing a blocking threshold for said first priority level includes means for computing a number of channels, n, required to be available to said first priority level, such that said first priority level may achieve said targeted blocking rate.

16. The channel allocation system of claim 15, wherein said step of computing n for said first priority level includes means for statistically predicting n in accordance with the relation:

$$\frac{\frac{E^n}{n!}}{\sum_{i=o}^{n} \frac{E^i}{i!}} = B_T$$

Wherein $B_T$ designates said targeted blocking rate, and E designates said actual traffic intensity in Erlangs.

17. The channel allocation system of claim 16, wherein said means for computing a blocking threshold for said first priority level includes means for computing M in accordance with the relation:

$$M = n + p$$

Wherein p is the number of channels to which said first priority level does not have access.

18. The channel allocation system of claim 17, wherein said means for statistically estimating a traffic intensity for said first priority level may be implemented in a cyclical manner, said channel allocation system further comprising:

means for comparing a current traffic intensity estimation performed during said second cycle with a past traffic intensity estimation performed during said first cycle;

means, response to said current traffic intensity estimation deviating from said past traffic intensity estimation by an amount greater than or equal to a predetermined differential, for:

recomputing n for said first priority level in accordance with the relation:

$$\frac{\frac{E^n}{n!}}{\sum_{i=o}^{n} \frac{E^i}{i!}} = B_T$$

Wherein $B_T$ designates said targeted blocking rate of said first priority level, and E designates said actual traffic intensity experienced by said first priority level in Erlangs;

recomputing M in accordance with the relation:

$$M = n + p$$

Wherein p is the number of channels to which said first priority level does not have access; and means, response to said current traffic intensity estimation deviating from said past traffic intensity estimation by an amount less than said predetermined differential, for:

incrementing or decrementing said blocking threshold such that M is adjusted upward or downward as necessary such that said actual blocking rate experienced by said first priority level approaches said assigned targeted blocking rate.

19. The channel allocation system of claim 14, wherein said means for statistically estimating a traffic intensity for said first priority level comprises:

means for determining an actual blocking rate, B, for said first priority level; and means for statistically estimating said actual traffic intensity, E, for said first priority level in accordance with the relation:

$$\frac{\frac{E^N}{N!}}{\sum_{i=o}^{N} \frac{E^i}{i!}} = B$$

Wherein B designates said actual blocking rate for said first priority level, and N is the number of channels currently utilized by said first priority level.

20. The channel allocation system of claim 19, wherein said means for determining an actual blocking rate for said first priority level includes means for computing said actual blocking rate in accordance with the relation:

$$B = X/C$$

Wherein X designates the number of calls blocked for said first priority level over a pre-designated timestep, and C designates the total number of call requests made within said telecommunications subsystem during said timestep.

21. The channel allocation system of claim 19, wherein said means for statistically estimating a traffic intensity for said first priority level further comprises means for computing the number of channels, N, currently utilized within said first priority level in accordance with the relation:

$$N = [(Y/C) \times Z]$$

Wherein Y designates the number of call requests by said first priority level within a pre-designated timestep, C designates the total number of call requests made within said telecommunications subsystem during said pre-designated timestep, and Z designates the average number of channels utilized within said telecommunications subsystem during said timestep.

22. The channel allocation system of claim 19, wherein said telecommunication subsystem includes an intelligent network device, and wherein said means for determining an actual blocking rate for said first priority level comprises:

means for collecting operational measurements within said intelligent network device; and means for determining said actual blocking rate for said first priority level from said operational measurements.

23. The channel allocation system of claim 22, wherein said intelligent network device includes a processing unit which is in communicative contact with a customer database, said channel allocation system further comprising:

means for designating said first priority level utilizing a numeric code;

means for storing said numeric code designation of said first priority level within said customer database; and means for delivering said numeric code designation of said priority level from said customer database to said processing unit.

24. The channel allocation system of claim 23, wherein said means for assigning a targeted blocking rate, statistically estimating a traffic intensity, and computing a blocking threshold include said processing unit.

\* \* \* \* \*